US009177281B2

(12) United States Patent
Parameswaran et al.

(10) Patent No.: US 9,177,281 B2
(45) Date of Patent: Nov. 3, 2015

(54) SYSTEMS AND METHODS FOR A SECURE SHIPPING LABEL

(75) Inventors: Sathiyan Parameswaran, Morrisplains, NJ (US); Bruce Besserer, Old Tappan, NJ (US); Nicholas Costides, Alpharetta, GA (US); Mark Hilbush, Roseland, NJ (US)

(73) Assignee: United Parcel Service of America, Inc., Atlanta, GA (US)

( * ) Notice: Subject to any disclaimer, the term of this patent is extended or adjusted under 35 U.S.C. 154(b) by 1069 days.

(21) Appl. No.: 12/726,907

(22) Filed: Mar. 18, 2010

(65) Prior Publication Data

US 2011/0227729 A1    Sep. 22, 2011

(51) Int. Cl.
  *G08B 21/00* (2006.01)
  *G06Q 10/08* (2012.01)

(52) U.S. Cl.
  CPC ...................... *G06Q 10/08* (2013.01)

(58) Field of Classification Search
  None
  See application file for complete search history.

(56) References Cited

U.S. PATENT DOCUMENTS

| | | | |
|---|---|---|---|
| 6,170,744 B1* | 1/2001 | Lee et al. | 235/380 |
| 6,175,827 B1* | 1/2001 | Cordery et al. | 705/410 |
| 6,834,273 B1 | 12/2004 | Sansone et al. | |
| 7,130,087 B2 | 10/2006 | Rhoads | |
| 7,136,502 B2 | 11/2006 | Rhoads et al. | |
| 7,153,557 B2 | 12/2006 | Rancien | |
| 7,191,158 B2 | 3/2007 | Ogg et al. | |
| 7,221,276 B2 | 5/2007 | Olsen, III et al. | |
| 7,299,984 B2 | 11/2007 | Euchner et al. | |
| 7,383,441 B2 | 6/2008 | Vorbruggen et al. | |
| 7,386,728 B1 | 6/2008 | Lang et al. | |
| 7,389,274 B2 | 6/2008 | Sansone et al. | |
| 7,396,048 B2 | 7/2008 | Janetzke et al. | |
| 7,427,025 B2* | 9/2008 | Poulin et al. | 235/386 |
| 7,580,529 B2 | 8/2009 | Fery et al. | |
| 7,831,518 B2* | 11/2010 | Montgomery et al. | 705/62 |
| 8,046,311 B2* | 10/2011 | Ferraro et al. | 705/401 |
| 2002/0111914 A1 | 8/2002 | Terada et al. | |
| 2005/0097066 A1* | 5/2005 | Nambudiri | 705/401 |
| 2005/0138469 A1* | 6/2005 | Ryan et al. | 714/20 |
| 2007/0000818 A1* | 1/2007 | Delitz et al. | 209/534 |
| 2007/0185726 A1* | 8/2007 | Stickler et al. | 705/1 |
| 2007/0299684 A1* | 12/2007 | Goodwin | 705/1 |
| 2008/0167881 A1* | 7/2008 | Haas | 704/500 |
| 2008/0256363 A1* | 10/2008 | Balacheff et al. | 713/187 |
| 2011/0154006 A1* | 6/2011 | Natu et al. | 713/2 |

FOREIGN PATENT DOCUMENTS

WO    WO 2008/049597 A1    5/2008

\* cited by examiner

*Primary Examiner* — Firmin Backer
*Assistant Examiner* — Brian Wilson
(74) *Attorney, Agent, or Firm* — Alston & Bird LLP (57) ABSTRACT

According to various embodiments, a shipping label validation system is provided for determining whether a shipping label is valid or counterfeit. The system may be used, for example, by a shipping entity (e.g., a common carrier) to prevent counterfeiting by generating and embedding onto the shipping label a shipping label hash index based upon at least a portion of the data located on the shipping label. The shipping label data may include, for example, a sender's address, recipient's address, package weight, tracking number, routing code, service code, and/or MaxiCode. The system may also be used to detect existing counterfeit shipping labels by independently generating a confirmation hash index based upon the same portion of the data used to calculate the shipping label hash index. In various embodiments, the system identifies counterfeit shipping labels based upon any discrepancies revealed when comparing the shipping label hash index to the confirmation hash index.

17 Claims, 9 Drawing Sheets

SYSTEMS AND METHODS FOR A SECURE SHIPPING LABEL

BACKGROUND OF THE INVENTION

Shipping carriers (e.g., common carriers, such as United Parcel Service, Inc. (UPS), FedEx, United States Postal Service (USPS), etc.), transport packages to and from a variety of clients for different purposes. Generally, the shipping carriers route, track, and identify such packages with shipping labels that contains pertinent information such as a recipient address, a tracking number, and/or a routing code. Upon affixing the shipping labels to the packages, subsequent transport of the packages is governed largely by the information contained on the shipping labels. Unfortunately, the shipping labels rarely convey whether payment has indeed been received. To shipping carriers, whose revenue depends on payments received to transport the packages, verification that shipping labels are valid (e.g., that payment has indeed been received) remains important. In the past, efforts have focused on the use of physical identifiers (e.g., micro printing, taggants, encryption, e-signature, general machine-readable codes, etc.) to deter or detect counterfeit shipping labels. Such physical identifiers often introduce minor inaccuracies into the shipping label and/or may be hacked easily by those in the counterfeiting business. With access to counterfeit shipping labels, shippers could potentially ship packages without having to submit payment for transport costs, which in turn hurts the shipping carriers' revenue stream. Thus, a need exists to provide systems and methods to effectively deter and detect counterfeit shipping labels prior to the execution of the package shipping process.

BRIEF SUMMARY OF THE INVENTION

According to various embodiments of the present invention, a shipping label validation system is provided for comparing two independently calculated hash indices associated with a shipping label to determine whether the shipping label is valid or counterfeit. Various embodiments of the shipping label validation system include one or more memory storage areas and one or more computer processors, wherein the shipping label validation system is configured for: (i) receiving a shipping label hash index that has been obtained by reading the shipping label hash index from a shipping label; (ii) receiving hash index verification information that has been obtained by reading the hash index verification information from the shipping label; (iii) using the hash index verification information to calculate a confirmation hash index; and (iv) using the shipping label hash index and the confirmation hash index to determine whether the shipping label is a valid shipping label.

According to other embodiments of the present invention, a computer program product is provided for capturing, storing, and analyzing data associated with a shipping label to determine whether the shipping label is valid or counterfeit. Various embodiments of the computer program product include at least one computer-readable storage medium having computer-readable program code portions embodied therein, the computer-readable program code portions comprising: (i) a first executable portion configured for receiving data associated with a shipping label, wherein the data comprises label content data and an embedded hash index; (ii) a second executable portion configured for calculating a confirmation hash index, the confirmation hash index being based upon and derived from the label content data; and (iii) a third executable portion configured for using the confirmation hash index and the embedded hash index to determine whether the shipping label is a valid shipping label.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Various embodiments of the present invention now will be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. Like numbers refer to like elements throughout.

Methods, Apparatus, Systems, and Computer Program Products

As should be appreciated, various embodiments may be implemented in various ways, including as methods, apparatus, systems, or computer program products. Accordingly, the embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

General Overview

In general, according to various embodiments of the present invention, methods, apparatus, systems, and computer program products are provided for determining whether a shipping label is valid or counterfeit. This may include capturing, storing, and analyzing content data associated with a shipping label such as, for example, a sender's address, a recipient's address, a package weight, a tracking number, a routing code, a service code, and a machine-readable symbol. To combat counterfeiting measures, in various embodiments, a shipping label hash index is generated by a cryptographic hash function that uses at least a portion of the label content data associated with the shipping label to generate the index as a single identifier for the label content data. The shipping label hash index may be embedded within the shipping label, for example, within the machine-readable symbol. To detect counterfeiting attempts, in various embodiments, a confirmation hash index is independently generated by a cryptographic hash function that operates substantially the same as the cryptographic hash function initially used to create the shipping label hash index. In certain embodiments, hash key values are input together with the label content data to generate the confirmation hash index. In various embodiments, counterfeit shipping labels are identified by comparing the shipping label hash index to the confirmation hash index. In certain embodiments, any discrepancies between the two indices indicate that the shipping label is counterfeit (i.e. not valid). This process can be performed at a variety of locations and timeframes prior to shipping a package to which the shipping label is affixed to (a) combat efforts to counterfeit shipping labels and (b) detect counterfeit shipping labels presently in use.

System Architecture

Figure 1:
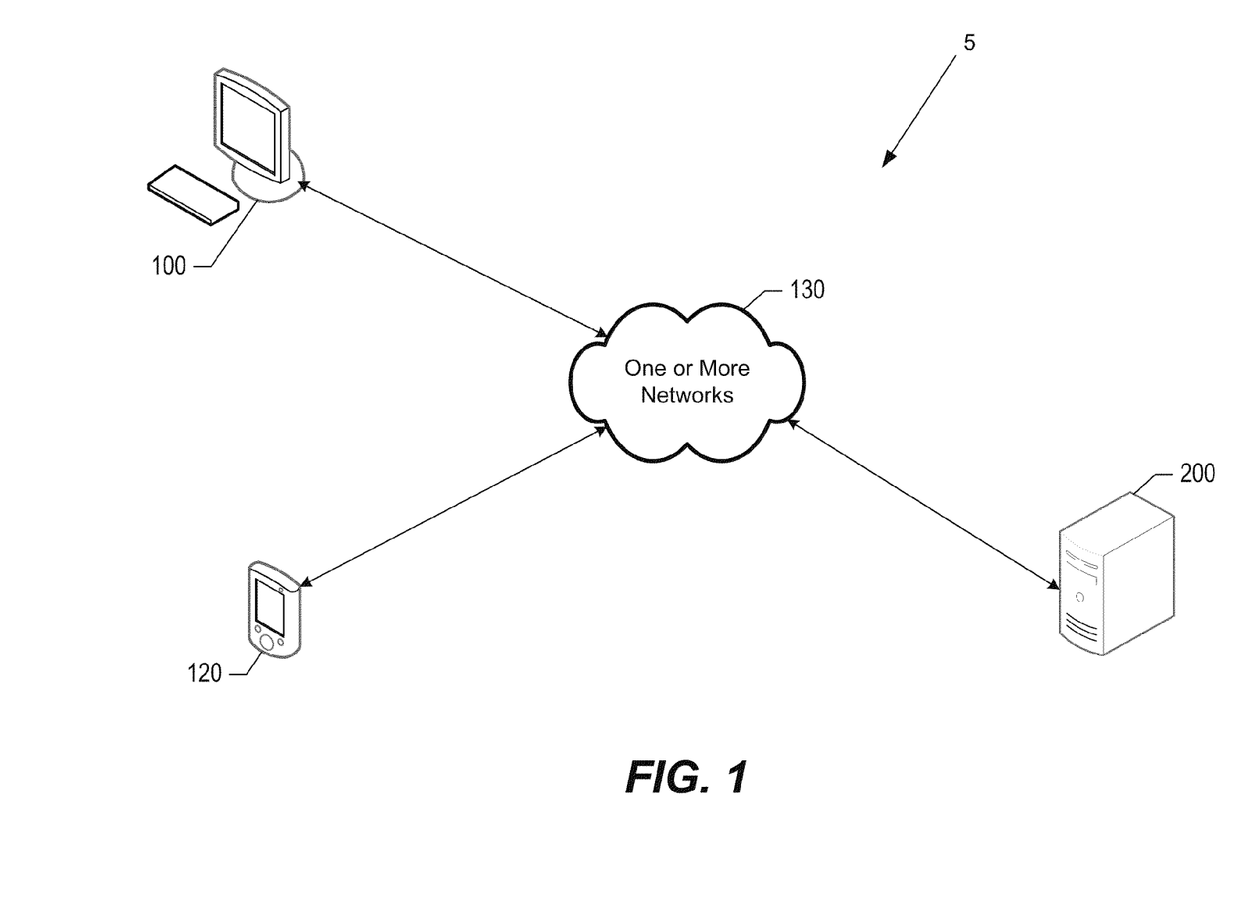
FIG. 1 is a block diagram of a shipping label validation system according to various embodiments.

FIG. 1 provides an illustration of one type of a shipping label validation system 5 that can be used in conjunction with various embodiments of the present invention. In the illustrated embodiment, the system 5 may include one or more networks 130, a data acquisition device 120, a central server 200, and a remote terminal 100. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the data acquisition device 120, the central server 200, and the remote terminal 100 are illustrated in FIG. 1 as communicating with one another over the same one or more networks 130, these devices may likewise communicate over multiple, separate networks. For example, while the data acquisition device 120 may communicate with the central server 200 over a wireless personal area network (WPAN) using, for example, Bluetooth techniques, the remote terminal 100 may communicate with the central server 200 over a wireless wide area network (WWAN), for example, in accordance with EDGE, or some other 2.5G wireless communication protocol.

According to one embodiment, in addition to receiving data from the remote terminal 100 and/or the central server 200, the data acquisition device 120 may be further configured to collect and transmit data on its own. For example, according to one embodiment, the data acquisition device 120 may include a camera and/or scanner for providing label content data in the form of, for example, tracking number and routing code values. In particular embodiments, and as is discussed in more detail below, this camera and/or scanner may be used to gather information regarding a shipping label, which may, in turn, be used to determine whether the shipping label is valid or counterfeit.

The data acquisition device 120 may be any device associated with a carrier (e.g., a common carrier, such as UPS, FedEx, USPS, etc.). In various embodiments, the data acquisition device 120 may be capable of receiving data via one or more input units or devices, such as a keypad, touchpad, barcode scanner, radio frequency identification (RFID)

reader, interface card (e.g., modem, etc.) or receiver. The data acquisition device 120 may further be capable of storing data to one or more volatile or non-volatile memory modules, and outputting the data via one or more output units or devices, for example, by displaying data to the user operating the device, or by transmitting data, for example over the one or more networks 130. In certain embodiments, the data acquisition device 120 may also be capable of calculating and comparing the confirmation hash index 515, as described in further detail below. One type of data acquisition device 120, which may be used in conjunction with embodiments of the present invention is the Delivery Information Acquisition Device (DIAD) presently utilized by UPS.

The remote terminal 100, in various embodiments, may be any device capable of receiving data via one or more input units or devices, such as a keypad, touchpad, barcode scanner, RFID, interface card (e.g., modem, etc.), or receiver. The remote terminal 100 may further be capable of storing data to one or more volatile or non-volatile memory modules, and outputting the data via one or more output units or devices, for example, by displaying data to the user operating the terminal 100, or by transmitting data, for example, over the network 130. In certain embodiments, the remote terminal 100 is associated with the carrier at a location remote from the central server 200. In other embodiments, the remote terminal 100 is associated with a client or customer, also at a location remote from the central server 200.

Central Server Architecture

In various embodiments, the central server 200 includes various systems for performing one or more functions in accordance with embodiments of the present invention, including those more particularly shown and described herein. It should be understood, however, that the central server 200 might include a variety of alternative devices for performing one or more like functions, without departing from the spirit and scope of the present invention. For example, at least a portion of the central server 200, in certain embodiments, may be located on the data acquisition device 120 or the remote terminal 100.

Figure 2:
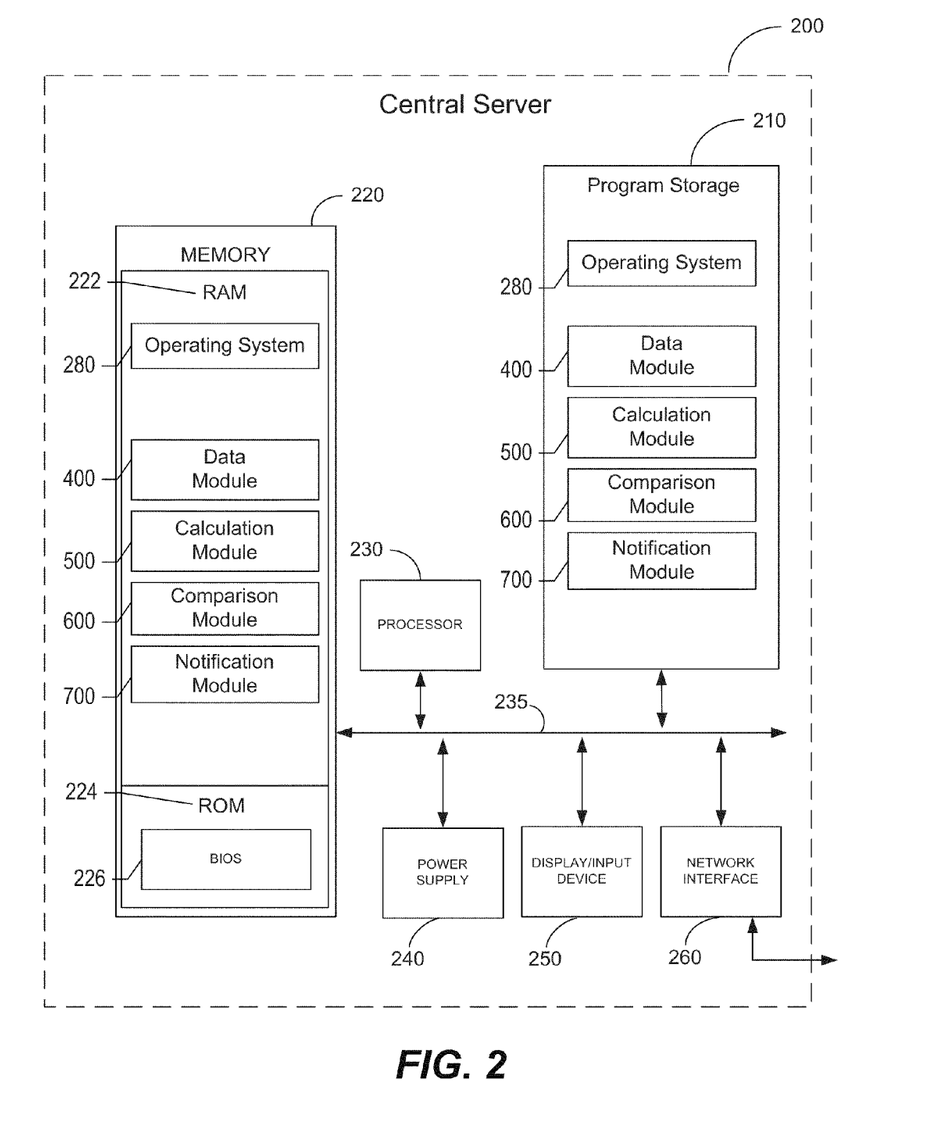
FIG. 2 is a schematic block diagram of a shipping carrier server according to various embodiments.

FIG. 2 is a schematic diagram of the central server 200 according to various embodiments. The central server 200 includes a processor 230 that communicates with other elements within the server via a system interface or bus 235. Also included in the central server 200 is a display/input device 250 for receiving and displaying data. This display/input device 250 may be, for example, a keyboard or pointing device that is used in combination with a monitor. The central server 200 further includes memory 220, which preferably includes both read only memory (ROM) 224 and random access memory (RAM) 222. The server's ROM 224 is used to store a basic input/output system 226 (BIOS), containing the basic routines that help to transfer information between elements within the central server 200.

In addition, the central server 200 includes one or more storage devices 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for the central server. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Also located within the central server 200 is a network interface 260 for interfacing and communicating with other elements of the one or more networks 130. It will be appreciated by one of ordinary skill in the art that one or more of the central server 200 components may be located geographically remotely from other central server 200 components. Furthermore, one or more of the central server 200 components may be combined, and/or additional components performing functions described herein may also be included in the central server 200.

While the foregoing describes a single processor 230, as one of ordinary skill in the art will recognize, the central server 200 may comprise multiple processors operating in conjunction with one another to perform the functionality described herein. In addition to the memory 220, the processor 230 can also be connected to at least one interface or other devices capable of displaying, transmitting and/or receiving data, content or the like. In this regard, the interface(s) can include at least one communication interface or other devices for transmitting and/or receiving data, content or the like, as well as one or more user interface that can include a display and/or a user input interface. The user input interface, in turn, can comprise any of a number of devices allowing the entity to receive data from a user, such as a keypad, a touch display, a joystick or other input device.

While reference is made to a central "server" 200, as one of ordinary skill in the art will recognize, embodiments of the present invention are not limited to a client-server architecture. The system of embodiments of the present invention is further not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the central server 200 may likewise be used without departing from the spirit and scope of embodiments of the present invention.

As illustrated in FIG. 2, a number of program modules may also be located within the central server 200. The program modules may be stored by the various storage devices 210 and within RAM 222. Such program modules include an operating system 280, a data module 400, a calculation module 500, a comparison module 600, and a notification module 700. According to various embodiments, these modules 400, 500, 600, and 700, control certain aspects of the operation of the central server 200 with the assistance of the processor 230 and operating system 280.

Figure 3:
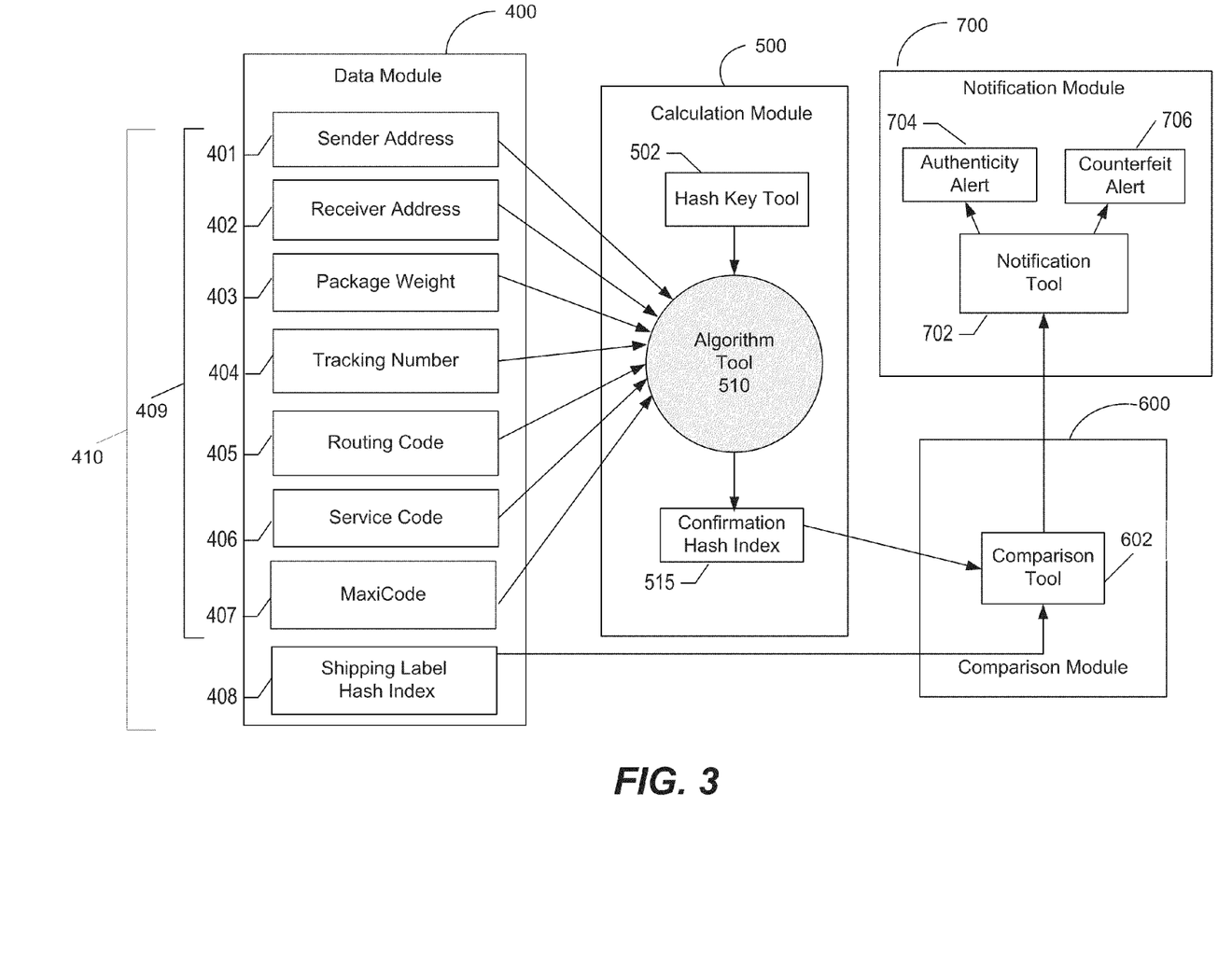
FIG. 3 is a schematic block diagram of the data module, the calculation module, the comparison module, and the notification module shown in FIG. 2 according to various embodiments.

FIG. 3 is a schematic block diagram of how the various modules stored by the various storage devices 210 of the central server 200 interact with one another. In various embodiments, the data module 400 is configured to receive and store label content data 409 associated with a shipping label 150 (not shown). As will be discussed in further detail below, the label content data 409 may include, for example, a sender address 401, a receiver address 402, a package weight 403, a tracking number 404, a routing code 405, a service code 406, and a machine-readable symbol 407 such as, for example, a MaxiCode, a PDF417 code, a Micro PDF417 code, a QR code, or any comparable symbol as generally known and used in the art. In certain embodiments, the data module 400 is also configured to receive and store a shipping label hash index 408. The label content data may include any combination of these data and/or other data. In the illustrated embodiment, the label content data 409 and the shipping label hash index 408, when combined, comprise the entirety of shipping label data 410.

In various embodiments, the data module 400 is configured to provide the label content data 409 to the calculation module 500 and to provide the shipping label hash index 408 to the comparison module 600. In certain embodiments, the calculation module 500 is configured to activate an algorithm tool 510 that, in turn, calculates a confirmation hash index 515 based upon at least a portion of the label content data 409. As will be discussed in further detail below, in a particular embodiment, the algorithm tool 510 is activated by a hash key tool 502. In certain embodiments, the calculation module 500 is further configured to provide the confirmation hash index 515 to the comparison module 600.

In various embodiments, the comparison module 600 is configured to receive and compare the confirmation hash index 515 and the shipping label hash index 408, and to identify any discrepancies between the two indices. In certain embodiments, the comparison module 600 transmits its findings to the notification module 700 for further processing. In particular embodiments, the notification module 700 is configured to execute a notification tool 702 that generates either an authenticity alert 704 or a counterfeit alert 704, depending on the indication received from the comparison module 600. In various embodiments, the notification tool 702 generates the authenticity alert 704 in response to the comparison module 600 finding no discrepancies, and generates the counterfeit alert 706 in response to the comparison module 600 finding one or more discrepancies.

In a particular embodiment, these program modules 400, 500, 600, 700, and 800, are executed by the central server 200 and are configured to generate graphical user interfaces accessible to users of the system 5. In one embodiment, the user interfaces may be accessible via one or more networks 130, which may include the Internet or other suitable communications network, as previously discussed. In other embodiments, one or more of the modules 400, 500, 600, 700, and 800 may be stored locally on one or more remote terminals 100 and/or data acquisition devices 120, and may be executed by one or more processors of the terminals 100 and/or devices 120. According to various embodiments, the modules 400, 500, 600, and 700 may send data to, receive data from, and utilize data contained in, a database, which may be comprised of one or more separate, linked and/or networked databases.

Central Server Logic

Figure 4:
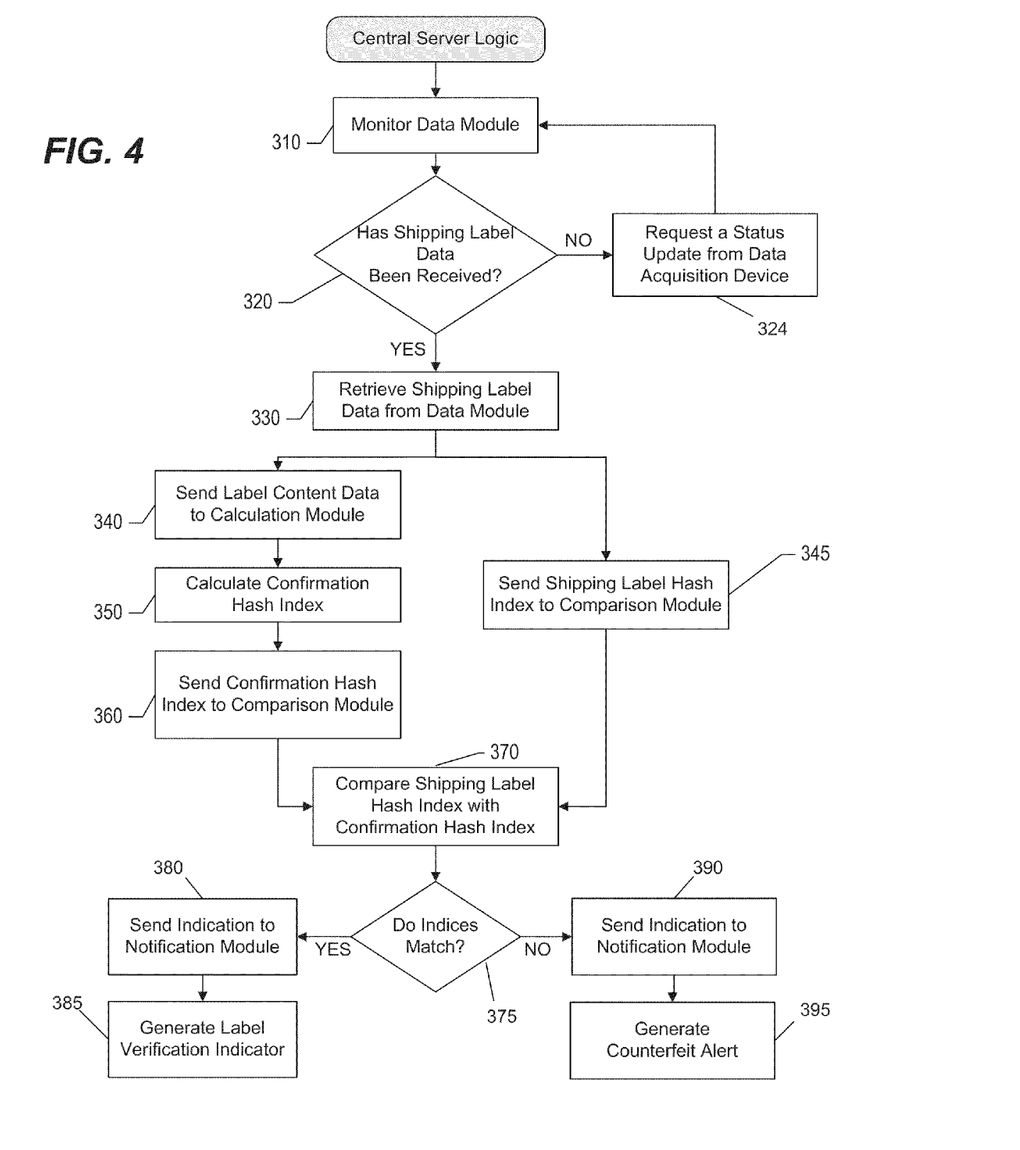
FIG. 4 is a flow diagram of steps executed by the central server shown in FIG. 2 according to various embodiments.

FIG. 4 illustrates steps that may be executed by the central server 200 to analyze label content data 409 captured by and received from the data acquisition device 120 and/or the remote terminal 100, calculate a confirmation hash index 515 based on at least a portion of the label content data 409, identify any discrepancies between the confirmation hash index 515 and the shipping label hash index 408, and generate an appropriate alert depending on the identified discrepancies. In various embodiments, the steps illustrated in FIG. 4 may also be executed by the data acquisition device 120 without any assistance from the central server 200.

Beginning with step 310, the central server 200, according to various embodiments, periodically monitors the data module 400 to assess whether any data associated with a shipping label (e.g., shipping label data 410, as shown in FIG. 3) has been received from the data acquisition device 120. In certain embodiments, the shipping label data 410 may include various pieces of information located on a shipping label 150. The shipping label data 410, according to various embodiments, may include, for example, a sender address 401, a receiver address 402, a package weight 403, a tracking number 404, a routing code 405, a service code 406, a machine-readable symbol 407, and a shipping label hash index 408. The machine-readable symbol, in various embodiments, may be a MaxiCode, a PDF417 code, a Micro PDF417 code, a QR code, or any comparable symbol as generally known and used in the art. For purposes of illustration, the MaxiCode is a public domain, machine-readable symbol that resembles a barcode, but use dots arranged in a hexagonal grid instead of bars. MaxiCodes can be helpful in tracking and managing the shipment of packages. In the embodiment illustrated in FIG. 9, the shipping label hash index 408 is embedded within the machine-readable symbol 407, though in other embodiments, the index may be embedded elsewhere on the shipping label 150.

Returning to FIG. 4, if, during step 320, the central server 200 determines that no shipping label data 410 has been received, the central server proceeds to step 324, in which the central server requests a status update from the data acquisition device 120. In various embodiments, once the shipping label data 410 has been requested, the central server 200 returns to steps 310 and 320 to reassess whether any data has been received at the data module 400. In one embodiment, when back at step 320 for a second time, if shipping label data 410 still does not arrive, the central server 200 will passively await receipt of the data. In another embodiment, when back at step 320 for a second or subsequent time, if shipping label data 410 still does not arrive, the central server 200 will continually loop back through step 324 until shipping label data is received. In other embodiments (not shown), the central server 200 may contact a remote terminal 100 instead of and/or in addition to the data acquisition device 120. In still further embodiments, the central server logic is triggered by a message received from a data acquisition device or the data module.

If, during step 320, the central server 200 determines that shipping label data 410 has been received at the data module 400, the server proceeds to step 330 and retrieves the data from the module. The central server 200 then proceeds to step 340, during which the server contacts the calculation module 500 in preparation for calculating a confirmation hash index 515 (see FIG. 3). In step 350, the server instructs the calculation module 500 to calculate the confirmation hash index 515. In various embodiments, calculation of the confirmation hash index 515 involves the execution of an algorithm tool 510, as shown in FIG. 3. In various embodiments, the algorithm tool 510 is fully executed in response to label content data 410 being transmitted to the calculation module 500 by the central server 200. In other embodiments, the algorithm tool 510 requires a hash key tool 505 to retrieve and input one or more hash key values into the algorithm tool 510 to fully execute the algorithm tool. In those embodiments, as will be discussed in more detail below, the algorithm tool 510 cannot be fully executed without the hash key values.

In certain embodiments, as will also be discussed in more detail below, the algorithm tool 510 executes a cryptographic hash function that inputs various portions of elements within the label content data 409 and outputs them as a single identifier (e.g., the confirmation hash index 515). In various embodiments, the portion of the label content data used to generate the confirmation hash index may be referred to generally as hash index verification information. In various embodiments, the cryptographic hash function may be any of a variety of such functions as commonly known and available. In a particular embodiment, the cryptographic hash function is a Secure-Hash-Algorithm-2 (SHA-2). In another embodiment, the cryptographic hash function is any one of a number of comparable algorithms capable of creating a 10-byte or greater hash index.

Returning to FIG. 4, in various embodiments, once the confirmation hash index 515 is calculated, the central server 200 proceeds to step 360 and instructs the calculation module 500 to send the index to the comparison module 600. As will be discussed in further detail later, in certain embodiments, the central server 200 also instructs the calculation module 500 to send the shipping label hash index 408 to the comparison module 600. In other embodiments, the central server 200 instructs the comparison module 600 to periodically scan for and retrieve the two indices from the calculation module 500 and the data module 400. In still other embodiments, the data and calculation modules 400, 500 may automatically transmit the two hash indices to the comparison module 600 once they are either received or calculated.

In various embodiments, during step 370, the central server 200 instructs the comparison module 600 to compare the shipping label hash index 408 obtained from the shipping label 150 itself with the newly calculated confirmation hash index 515. In certain embodiments, this comparison involves execution of a comparison tool 602, as illustrated in FIG. 3. In various embodiments, the comparison tool 602 may comprise a value comparison utility, or any comparable utility, as are commonly known and available, that is capable of identifying discrepancies between values within the indices.

Once the hash indices have been compared, the central server proceeds to step 375, querying whether the indices match. If any discrepancies exist (e.g., the indices do not "match"), the central server 200, according to various embodiments, executes steps 390 and 395, sending an indication to the notification module 700 and instructing the module to generate a counterfeit alert. In various embodiments, the counterfeit alert identifies the shipping label 150 as being invalid. In various embodiments, if no discrepancies are identified (e.g., the indices do "match"), the central server 200 executes steps 380 and 385, sending an indication to the notification module 700 and instructing the module to generate an authenticity alert. In various embodiments, the authenticity alert identifies the shipping label 150 as being valid.

Data Module Logic

Figure 5:
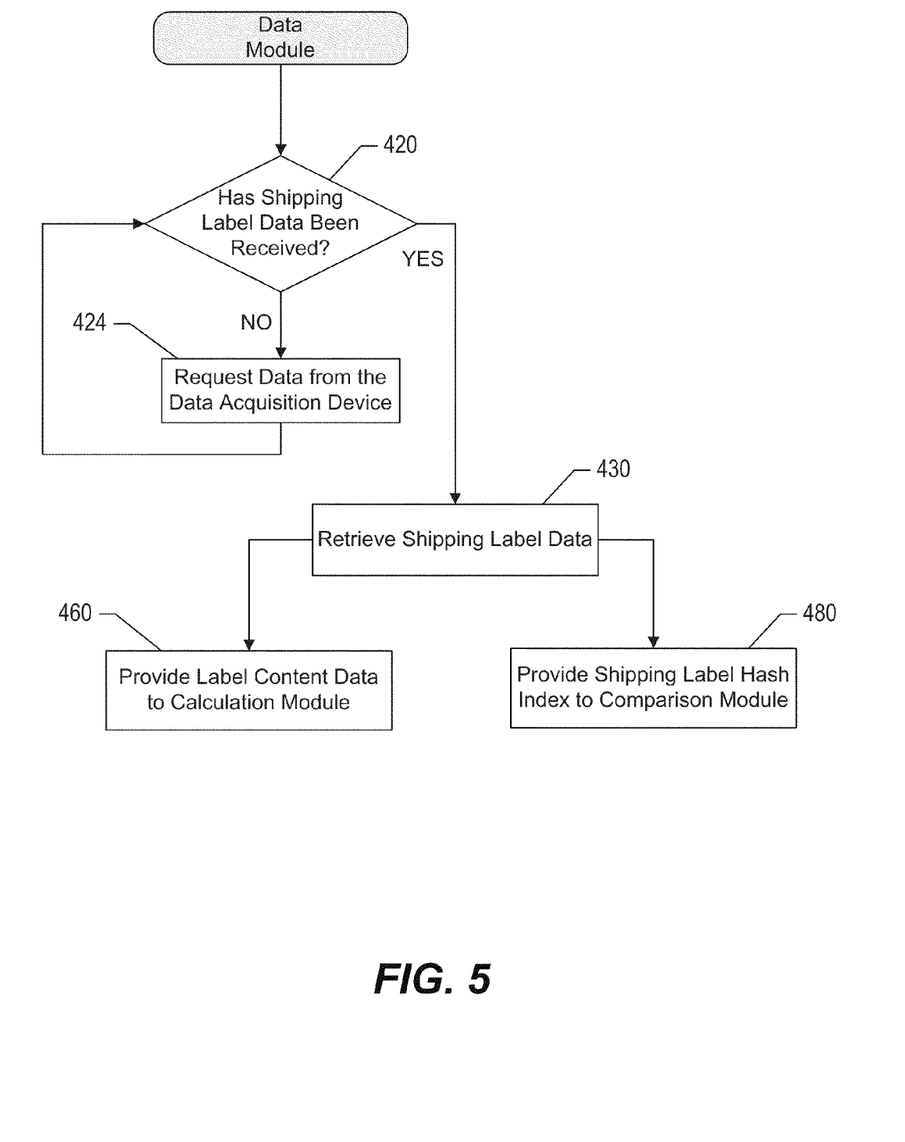
FIG. 5 is a flow diagram of steps executed by the data module shown in FIG. 2 according to various embodiments.

According to various embodiments, the data module 400 is configured to receive and store label content data 409 and a shipping label hash index 408 associated with a shipping label 150. In certain embodiments, the data module 400 is configured to provide the label content data 409 to the calculation module 500 and to provide the shipping label hash index 408 to the comparison module 600. FIG. 5 illustrates steps that may be executed by the data module 400 according to various embodiments. Beginning with step 420, the data module 400 assesses whether data associated with a shipping label 150 (e.g., shipping label data 410 as shown in FIG. 4) has been received by the module. In certain embodiments, the data module 400 makes this assessment by periodically scanning one or more databases associated with the module and identifying shipping label data 150 within the databases that was not present during a previous periodic scan under step 420. In various embodiments, if new shipping label data 410 has been received, the data module 400 proceeds to step 430.

Figure 9:
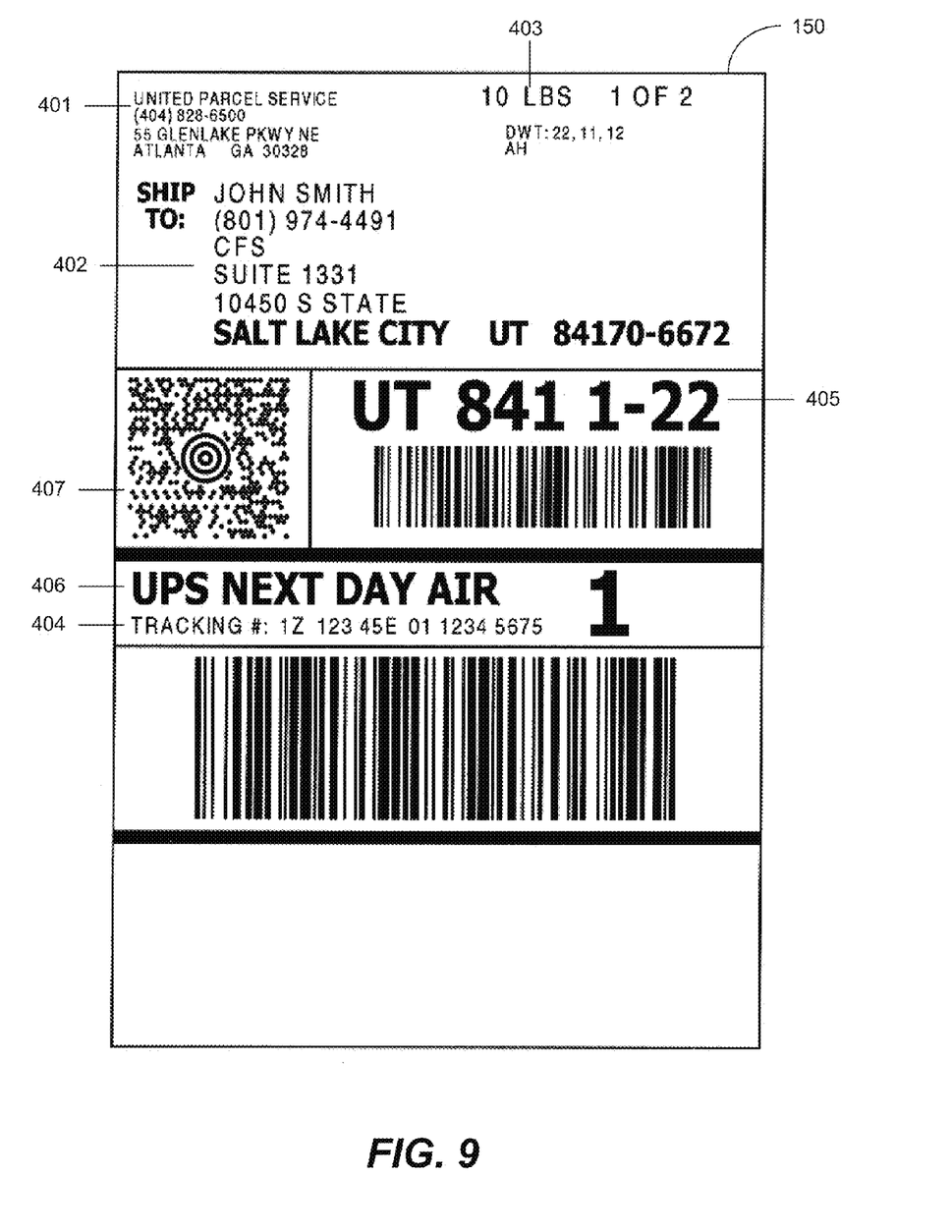
FIG. 9 is a shipping label according to one embodiment.

In various embodiments, the shipping label data 410 retrieved in step 430 includes a variety of information associated with a shipping label 150. As illustrated in FIG. 9, the shipping label 150 may include one or more addresses, for example, a sender address 401 and a recipient address 402. In certain embodiments, the shipping label 150 further includes a weight 403 of a package associated with the shipping label 150. In one embodiment, the shipping label 150 includes a tracking number 404, a routing code 405, and a service code 406. In other embodiments, the shipping label 150 includes various combinations of the shipping label data 410, such as, for example, a routing code 405, a sender address 401, a package weight 403, and a machine-readable symbol 407, such as, for example, a MaxiCode, a PDF417 code, a Micro PDF417 code, a QR code, or any comparable symbol as generally known and used in the art. In various embodiments, each of these pieces of information enable shipping carriers (e.g., common carriers, such as United Parcel Service, Inc. (UPS), FedEx, United States Postal Service (USPS), etc.) to receive, transport, and monitor various aspects of the package shipping process.

In various embodiments, the shipping label data 410 retrieved in step 430 includes a shipping label hash index 408. According to various embodiments, the shipping label hash index 408 is initially created using a cryptographic hash function substantially the same as the cryptographic hash function executed by the algorithm tool 510 to calculate the confirmation hash index 515 (see FIG. 3). In various embodiments, the cryptographic hash function inputs various portions of elements within the label content data 409 and outputs them as a single identifier (e.g., the confirmation hash index 515). For example, in certain embodiments, portions of the recipient address 402, the package weight 403, and the tracking number 404 are inputs to the hash function. In other embodiments, portions of the routing code 405, service code 406, and/or the sender address 401 comprise the necessary function inputs. In other embodiments, portions of one or more hash key values selected by a hash key tool 505 (see FIG. 3) serve as an input to the cryptographic hash function alongside the various portions of elements within the label content data 409. In various embodiments, the cryptographic hash function may be any of a variety of such functions as commonly known and available. In a particular embodiment, the cryptographic hash function is a Secure-Hash-Algorithm-2 (SHA-2). In another embodiment, the cryptographic hash function is any one of a number of comparable algorithms capable of creating a 10-byte or greater hash index.

In various embodiments, the shipping label data 410 retrieved in step 430 further includes a machine-readable symbol 407, such as, for example, a MaxiCode, a PDF417 code, a Micro PDF417 code, a QR code, or any comparable symbol as generally known and used in the art. The MaxiCode, for purposes of illustration is a public domain, machine-readable symbol that resembles a barcode, but uses dots arranged in a hexagonal grid instead of bars. In certain embodiments, the MaxiCode assists shipping carriers with tracking and managing the shipment of packages. In various embodiments, a variety of information may be embedded into the machine-readable symbol 407. In the embodiment illustrated in FIG. 9, the shipping label hash index 408 is embedded within the machine-readable symbol 407. In other embodiments, the shipping label hash index 408 may be embedded elsewhere on the shipping label 150.

If, in various embodiments, no new shipping label data 410 has been received by the data module 400, the module proceeds, in step 424 to request data from the data acquisition device 120. In various embodiments, the data module 400 remains in a loop process, repeatedly querying the data acquisition device 120 until shipping label data 410 is received. In other embodiments, the data module 400 passively awaits receipt of shipping label data 410 after executing steps 424 and 420 a single time. In one embodiment (not shown), the data module 400 may query a remote terminal 100 regarding shipping label data 410 instead of and/or in addition to querying the data acquisition device 120.

Once the data module retrieves the shipping label data 410 in step 430, the module proceeds to steps 460 and 480. In various embodiments, during step 460, the data module 400 provides at least a portion of the label content data 409 to the calculation module 500. As will be discussed in further detail below, the calculation module 500 uses the provided label content data 409, which may also be referred to generally as hash index verification information, to derive a confirmation hash index 515. In various embodiments, during step 480, the data module 400 provides the shipping label hash index 408 to the comparison module 600. As will be discussed in further detail below in relation to FIG. 7, the comparison module 600 uses the shipping label hash index 408 to identify any discrepancies between that index and the confirmation hash index 515.

Calculation Module Logic

According to various embodiments, the calculation module 500 is configured to execute an algorithm tool 510 to calculate a confirmation hash index 515 based upon at least a portion of the data associated with the shipping label. In various embodiments, the algorithm tool 510 is fully executed based upon label content data 409 received from the data module 400. In other embodiments, the algorithm tool 510 requires a hash key tool 505 to retrieve and input one or more hash key values into the algorithm tool 510. In those embodiments, the confirmation hash index 515 is calculated based upon the hash key values and the label content data 409. In other words, the algorithm tool 510 cannot be fully executed without first receiving and/or retrieving the proper hash key values. In various embodiments involving the hash key tool 505, the hash key values are changed periodically to protect against brute force hacking of the algorithm tool 510. In certain embodiments, the hash key values are randomly generated periodically. In other embodiments, a user (e.g., one with administrative privileges) generates new hash key values at a pre-established interval. In one embodiment, the pre-established interval is every six months.

Figure 6:
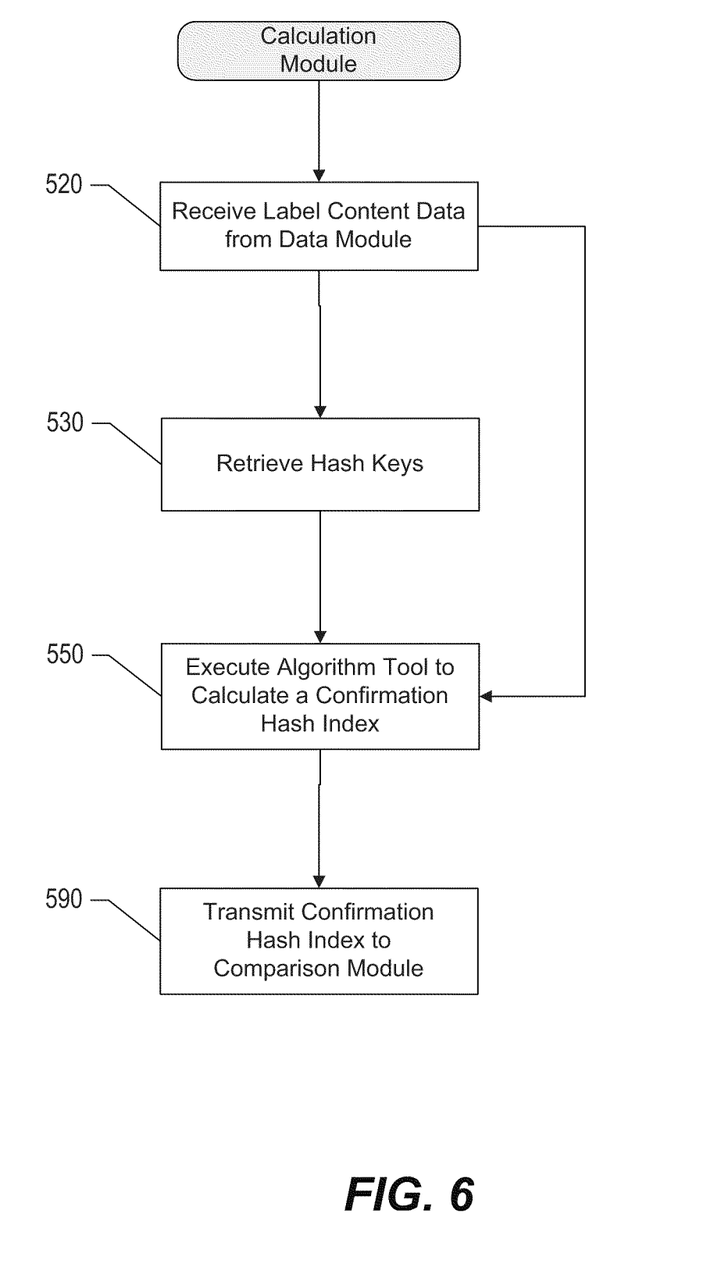
FIG. 6 is a flow diagram of steps executed by the calculation module shown in FIG. 2 according to various embodiments.

FIG. 6 illustrates steps that may be executed by the calculation module 500 according to various embodiments. Beginning with step 520, the calculation module 500 receives at least a portion of the shipping label data 410 from the data module 400. In various embodiments, the portion of the label content data used to generate the confirmation hash index may be referred to generally as hash index verification information. In certain embodiments, the calculation module 500 requests the data from the data module 400, while in other embodiments, the data module 400 transmits the data automatically without request from the calculation module 500. Once the shipping label data 410 has been received by the calculation module 500, the module, in certain embodiments proceeds to step 550, wherein the algorithm tool 510 is executed. In other embodiments, once the shipping label data 410 has been received, the calculation module 500 proceeds to retrieve one or more hash keys in step 530, which are in turn used, in part, to generate the confirmation hash index 515 during the execution of the algorithm tool 510 in step 550.

In those embodiments wherein the calculation module 500 proceeds to step 530, a hash key tool 502 retrieves one or more hash key values from a host module (not shown). The hash key values, in various embodiments, comprise a sequence of numerical and/or American Standard Code for Information Interchange (ASCII) data. In certain embodiments, the hash key values serve as an input, in combination with various portions of elements within the label content data 409, used to calculate the confirmation hash index 515.

In various embodiments, including both those involving the hash key tool 502 and hash key values and those without, the calculation module 500 proceeds to step 550. During step 550, in various embodiments, the module calculates the confirmation hash index 515. According to various embodiments, the confirmation hash index 515 is calculated by using a cryptographic hash function substantially the same as the cryptographic hash function initially executed to create the shipping label hash index 408. In various embodiments, the cryptographic hash function inputs various portions of elements within the label content data 409 and outputs them as a single identifier (e.g., the confirmation hash index 515). In certain embodiments, the cryptographic hash function inputs the hash key values retrieved by the hash key tool 502 in combination with the various portions of elements within the label content data 409 and outputs the combined data as the confirmation hash index 515. In any event, the two cryptographic hash functions, in various embodiments, always utilize the same portions of elements within the label content data 409 (and, where applicable, the hash key values) as inputs to the function. In various embodiments, the cryptographic hash function may be any of a variety of such functions as commonly known and available. In a particular embodiment, the cryptographic hash function is a Secure-Hash-Algorithm-2 (SHA-2). In another embodiment, the cryptographic hash function is any one of a number of comparable algorithms capable of creating a 10-byte or greater hash index.

In various embodiments, the confirmation hash index 515 computed by the tool is based on at least a portion of a sender address 401, a tracking number 404, and a machine-readable symbol 407, such as, for example, a MaxiCode, a PDF417 code, a Micro PDF417 code, a QR code, or any comparable symbol as generally known and used in the art. In other embodiments, the confirmation hash index 515 is based further on at least a portion of a receiver address 402, a package weight 403, a routing code 405, and a service code 406. FIG. 9 illustrates a possible label wherein for certain embodiments the confirmation hash index 515 may be derived from at least a portion of a street name within the sender address 401, at least a portion of a zip code within the receiver address 402, at least a portion of a third sequence of numbers within the tracking number 404, and/or at least some portion of data retrieved from the machine-readable symbol 407. In other embodiments, the confirmation hash index 515 may be derived from any combination of elements or portions of elements found within the shipping label data 410 as further illustrated in FIG. 9. In any of these embodiments, the algorithm tool 510 (in conjunction with the hash key tool 502, if applicable) defines the combination of elements upon which the confirmation hash index 515 is based. In various embodiments, the portion or combination of the elements used to compute the confirmation hash index might be referred to generally as hash index verification information.

In certain embodiments, the combination of elements from the label content data 409 that are used to compute the confirmation hash index 515 (and the shipping label hash index 408) are arranged in a three-dimensional array or cube. After the array or cube is created, the algorithm tool 510 parses the data within the array or cube (in combination with the hash key values retrieved by the hash key tool 515, where applicable), to create a data bit stream. The algorithm tool 510 then, accordingly to various embodiments, applies a plurality of iterations to the data bit stream, such that each iteration uses at least a portion of the data stream and the hash key values to generate the confirmation hash index 515. In certain embodiments, the iterations applied to the data bit stream are based upon a unique set of instructions stored on the central server 200. In various embodiments, the unique set of instructions is periodically updated to prevent brute force hacking of the algorithm tool 510.

In various embodiments, after calculating the confirmation hash index 515 in step 550, the calculation module 500 proceeds to step 590. In certain embodiments, during step 590, the module transmits the confirmation hash index 515 to the comparison module 600. In other embodiments, during step 590, the calculation module 500 passively makes the confirmation hash index 515 available to the comparison module 600 and provides the index upon request from the latter.

Comparison Module Logic

Figure 7:
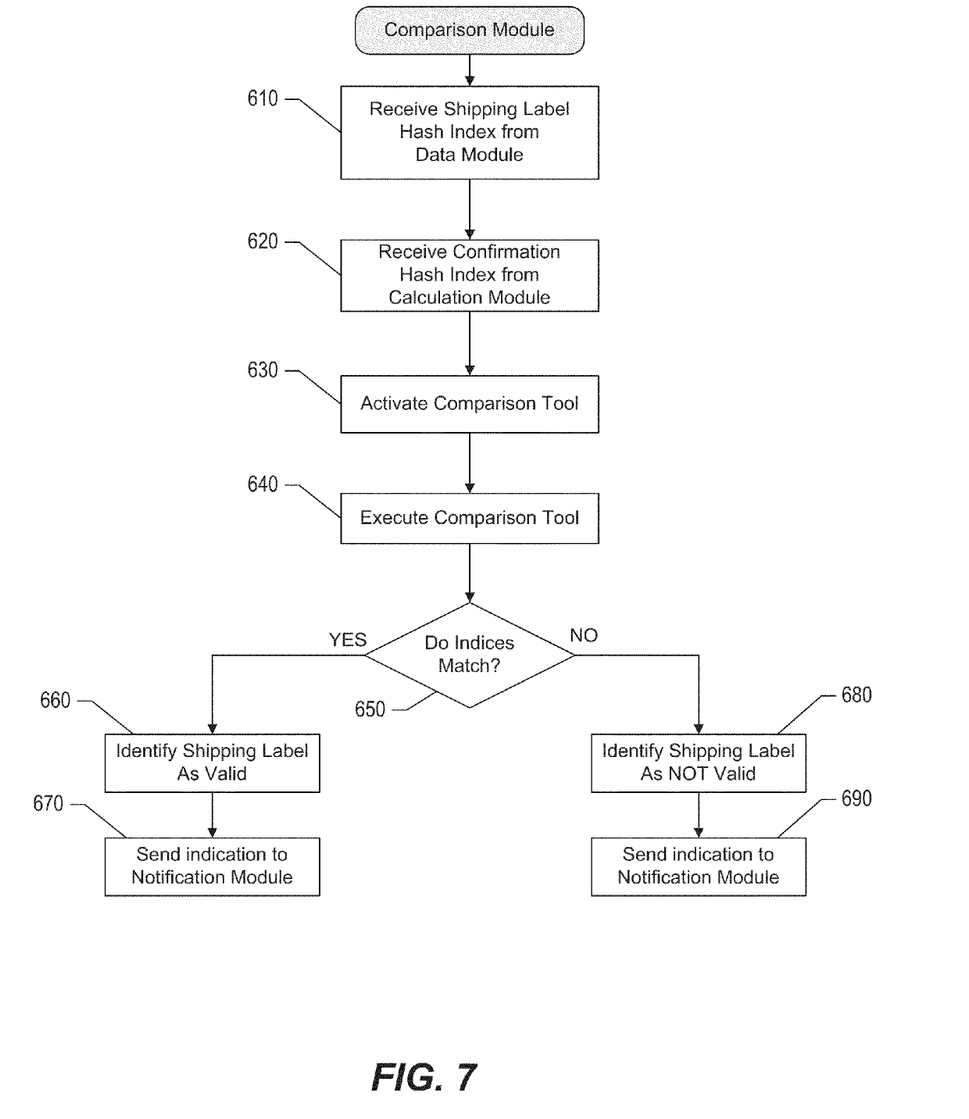
FIG. 7 is a flow diagram of steps executed by the comparison module shown in FIG. 2 according to various embodiments

According to various embodiments, the comparison module 600 is configured to compare the confirmation hash index 515 and the shipping label hash index 408 to identify any discrepancies between the two indices. In various embodiments, the comparison module 600 includes a comparison tool 602. FIG. 7 illustrates steps that may be executed by the comparison module 600 according to various embodiments. Beginning with step 610, in various embodiments, the comparison module 600 receives the shipping label hash index 408 from the data module 400. In certain embodiments, the shipping label hash index 408 is automatically provided to the comparison module 600 by the data module 400. In other embodiments, the comparison module 600 must query the data module 400 for transmittal of the index. In still other embodiments, the comparison module 600 receives (either automatically or in response to a query) the shipping label hash index 408 from the calculation module 500 as opposed to from the data module 400. In various embodiments, once the shipping label hash index 408 has been received, the comparison module 600 proceeds to step 620, wherein the module receives the confirmation hash index 515 from the calculation module 500. In certain embodiments, the confirmation hash index 515 is automatically provided to the comparison module 600 by the calculation module 500. In other embodiments, the comparison module 600 must query the calculation module 500 for transmittal of the index.

In various embodiments, the comparison module 600 includes a comparison tool 602. In certain embodiments, the comparison tool 602 is executed in step 640 to determine whether the two indices (408 and 515) match one another. In one embodiment, the comparison tool 602 executes a value comparison utility on the two indices to determine whether each character within one of the indices correlates with the corresponding character within the other of the indices. In other embodiments, a variety of comparable value and/or file comparison utilities, as are commonly known and available, may be used to identify any discrepancies between the two indices. In still other embodiments, the comparison tool 602 may prompt a visual assessment of the two indices by a system operator as at least a portion of the comparison process.

If, during step 650, no discrepancies are identified between the shipping label hash index 408 and the confirmation hash index 515, the comparison module 600, according to various embodiments, proceeds to step 660. During step 660, the comparison module 600 identifies the shipping label 150 as being a valid shipping label. In certain embodiments, the comparison module 600 then proceeds to step 670, during which the comparison module 600 notifies the notification module 700 that the shipping label 150 is valid. In other embodiments, the comparison module 600 passively provides its determination that the shipping label 150 is valid to the notification module 700 only when requested.

If, during step 650, one or more discrepancies are identified between the shipping label hash index 408 and the confirmation hash index 515, the comparison module 600, according to various embodiments, proceeds to step 680. During step 680, the comparison module 600 identifies the shipping label 150 as not being a valid shipping label (i.e., as being a counterfeit label). In certain embodiments, the comparison module then proceeds to step 690, during which the comparison module 600 notifies the notification module 700 that the shipping label 150 is invalid. In other embodiments, the comparison module 600 passively provides its determination that the shipping label 150 is invalid to the notification module 700 only when requested.

Notification Module Logic

According to various embodiments, the notification module 700 is configured to generate a counterfeit alert 706 that classifies the shipping label 150 as being a counterfeit label in response to the comparison module 600 finding discrepancies between the shipping label hash index 408 and the subsequently calculated confirmation hash index 515. In certain embodiments, the notification module 700 is also configured to generate the counterfeit alert 706 in response to the calculation module 500 identifying one or more hash keys as invalid. In various embodiments, the notification module 700 is configured to generate an authenticity alert 704 that classifies the shipping label 150 as being a valid label in response to the comparison module 600 finding no discrepancies between the shipping label hash index 408 and the subsequently calculated confirmation hash index 515.

Figure 8:
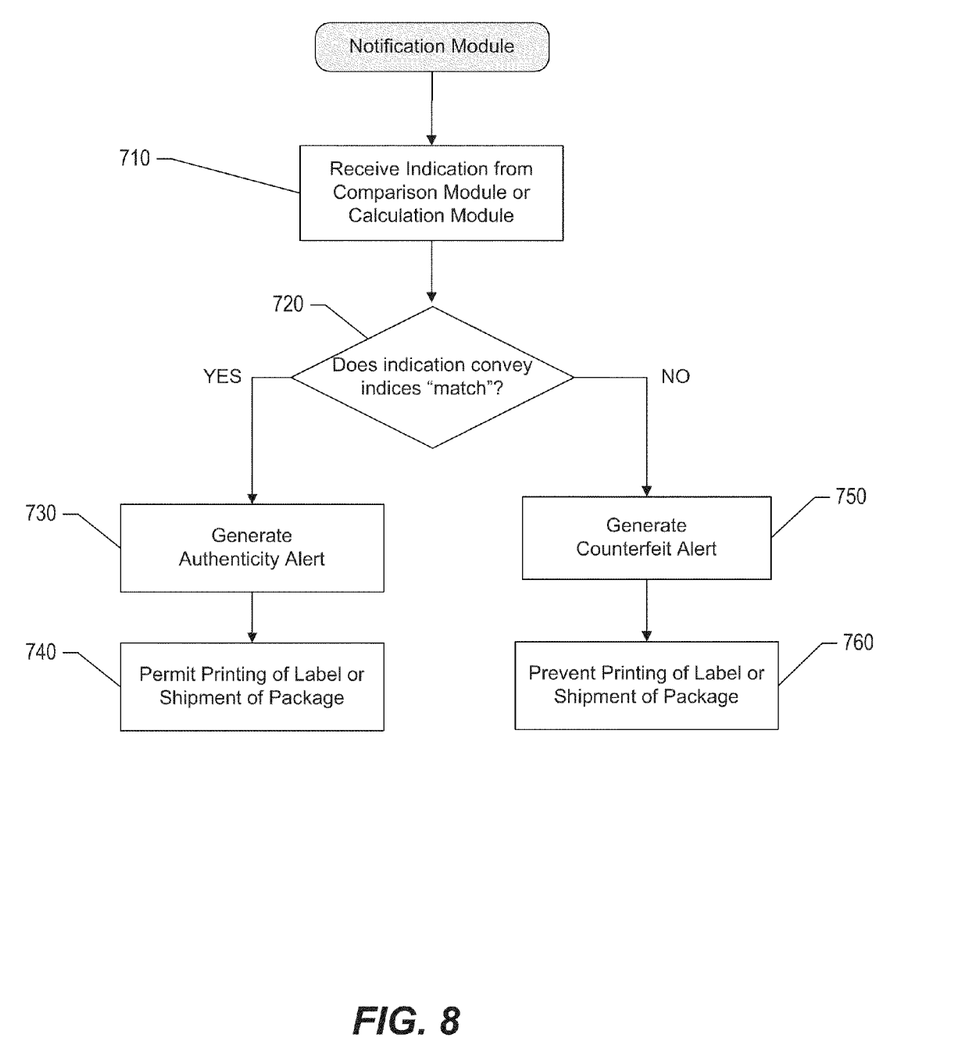
FIG. 8 is a flow diagram of steps executed by the notification module shown in FIG. 2 according to various embodiments.

FIG. 8 illustrates steps that may be executed by the notification module 700 according to various embodiments. Beginning with step 710, according to various embodiments, the notification module 700 receives an indication from the comparison module 600 or the calculation module 500. During step 720, the notification module 700 assesses whether the indication identifies a discrepancy or a match between the hash indices 408, 515 or the hash keys. If no discrepancies are identified, the notification module 700 proceeds to step 730, during which the module generates the authenticity alert 704. In certain embodiments, the label authenticity alert 704 causes the system 5 to authorize further transport of the package associated with the shipping label 150 by a shipping carrier. In a particular embodiment, the authenticity alert 704 is an audible indicator while in another embodiment, the alert is a visual indicator. In even further embodiments, the authenticity alert 704 is a combination of audible, visual, and/or any combination of indications as commonly known and understood in the art.

In various embodiments, during step 740, the authenticity alert 704 causes the system 5 to authorize and/or permit a user of the system 5 to print the shipping label 150. In various embodiments, the user may choose to print the shipping label 150 via the display/input device 250 of the system 5 (see FIG. 2). In certain embodiments, the printed shipping label 150 may be subject to additional verification by the system 5, such as for example, when a package associated with the shipping label 150 is received by the shipping carrier. In those embodiments, the calculation 500 and comparison 600 modules may again verify the validity of the shipping label 150 prior to authorizing further transport of the package.

Alternatively, if, during step 720, one or more discrepancies are identified, the notification module 700 proceeds to step 750, during which the module generates the counterfeit alert 706. In certain embodiments, the counterfeit alert 706 causes the system 5 to prevent further transport of the package associated with the shipping label 150 by a shipping carrier. In particular embodiments, the counterfeit alert 706 is an audible indicator while in other embodiments, the indicator is a visual indicator. In even further embodiments, the counterfeit alert 706 is a combination of audible, visual, and/or any combination of indications as commonly known and understood in the art.

In various embodiments, during step 760, the counterfeit alert 706 causes the system to prohibit and/or prevent a user of the system 5 from printing the shipping label 150. In certain of these embodiments, the system 5 notifies the user, via the display/input device 250, that the shipping label 150 has been identified as counterfeit. For example, in certain embodiment, the counterfeit alert 706 comprises a routing indicator that affects subsequent routing and/or transport of a package associated with the shipping label 150. In a particular embodiment, the routing indicator flags the package as undeliverable. In other embodiments, the routing indicator diverts the package for further inspection by the shipping carrier.

Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A shipping label validation system comprising:
   one or more memory storage areas; and
   one or more computer processors that are configured to receive data stored in the one or more memory storage areas, wherein the one or more computer processors are configured for:
   (A) receiving a shipping label hash index that has been obtained by reading the shipping label hash index from a shipping label;
   (B) receiving un-encoded hash index verification information that has been obtained by capturing the un-encoded hash index verification information from the shipping label, the un-encoded hash index verification information comprising a combination of address data and non-address data and being received separately from the shipping label hash index of (A);
   (C) using the un-encoded hash index verification information to calculate a confirmation hash index, said calculating being performed without reference to the shipping label hash index and including:
   i. retrieving at least one hash key value from the one or more memory storage areas;
   ii. determining whether the retrieved at least one hash key value is valid;
   iii. inputting the at least one hash key value into a calculation tool, activation of said calculation tool being dependent, at least in part, upon inputting of a valid hash key value; and
   iv. calculating the confirmation hash index based on the at least one hash key value and the un-encoded hash index verification information; and
   (D) determining whether the shipping label is a valid shipping label, said determination including:
   i. determining whether the retrieved at least one hash key value is valid;
   ii. comparing the shipping label hash index with the confirmation hash index;
   iii. in response to the shipping label hash index and the confirmation hash index being the same and the hash key value being valid, determining that the shipping label is a valid shipping label; and
   iv. in response to at least one of the shipping label hash index and the confirmation hash index not being the same or the hash key value being invalid, determining that the shipping label is not a valid shipping label.

2. The shipping label validation system of claim 1, wherein:
   the shipping label validation system further comprises one or more bar code scanners; and
   the shipping label hash index and the un-encoded hash index verification information have been obtained by scanning the shipping label with the one or more bar code scanners.

3. The shipping label validation system of claim 1, wherein:
   the shipping label validation system further comprises a camera; and
   the shipping label hash index and the un-encoded hash index verification information have been obtained by:
   (A) using the camera to take an image of the shipping label, and
   (B) retrieving the shipping label hash index and the hash index verification information from the image.

4. The shipping label validation system of claim 1, wherein the un-encoded hash index verification information comprises at least one label identifier.

5. The shipping label validation system of claim 4, wherein the at least one label identifier comprises at least one of a sender address, a recipient address, or a package weight printed on the shipping label.

6. The shipping label validation system of claim 5, wherein the at least one label identifier further comprises at least one of a tracking number, a routing code, or a service code printed on the shipping label.

7. The shipping label validation system of claim 1, wherein the calculation tool comprises a Secure-Hash-Algorithm (SHA-2).

8. The shipping label validation system of claim 1, wherein:
   in response to determining that the shipping label is not a valid shipping label, the one or more computer processors are further configured for generating a counterfeit alert.

9. The shipping label validation system of claim 8, wherein the counterfeit alert indicates that the shipping label is not valid.

10. The shipping label validation system of claim 8, wherein the counterfeit alert comprises at least one alert indicator that is selected from a group consisting of:
    an audible indicator, a visual indicator, and a routing indicator.

11. The shipping label validation system of claim 10, wherein the at least one alert indicator is a routing indicator, wherein the routing indicator flags a package associated with the shipping label as undeliverable.

12. The shipping label validation system of claim 1, wherein the step (D) further comprises:
    in response to determining that the shipping label is a valid shipping label, generating an authenticity alert; and
    in response to determining that the shipping label is not a valid shipping label, generating a counterfeit alert.

13. The shipping label validation system of claim 12, wherein the shipping label validation system is configured to allow a customer to print the shipping label in response to generating the authenticity alert.

14. The shipping label validation system of claim 12, wherein the shipping label validation system is configured to prevent a customer from printing the shipping label in response to generating the counterfeit alert.

15. A non-transitory computer program product comprising at least one computer-readable storage medium having computer-readable program code portions embodied therein, the computer-readable program code portions comprising:
   a first executable portion configured for receiving data associated with a shipping label, wherein the data comprises un-encoded label content data and an embedded hash index, the un-encoded label content data comprising a combination of address data and non-address data;
   a second executable portion configured for calculating a confirmation hash index, the confirmation hash index being based upon and derived from the un-encoded label content data without reference to the embedded hash index and including retrieving at least one hash key value, determining whether the retrieved at least one hash key value is valid, inputting the at least one hash key value into a calculation tool, activation of said calculation tool being dependent at least in part, upon inputting of a valid hash key value, and calculating the confirmation hash index based on the at least one hash key value and the un-encoded label content data; and
   a third executable portion configured for determining whether the shipping label is a valid shipping label, said determination including determining whether the retrieved at least one hash key value is valid, comparing the embedded hash index with the confirmation hash index, in response to the embedded hash index and the confirmation hash index being the same and the hash key value being valid, determining that the shipping label is a valid shipping label, and in response to at least one of the embedded hash index and the confirmation hash index not being the same or the hash key value being invalid, determining that the shipping label is not a valid shipping label.

16. The non-transitory computer program product of claim 15, wherein the third executable portion is further configured for:
   in response to determining that the shipping label is a valid shipping label, generating an authenticity alert; and
   in response to determining that the shipping label is not a valid shipping label, generating a counterfeit alert.

17. The non-transitory computer program product of claim 16, wherein the non-transitory computer program product is configured for:
   in response to the third executable portion generating the authenticity alert, allowing a customer to print the shipping label; and
   in response to the third executable portion generating the counterfeit alert, preventing a customer from printing the shipping label.

* * * * *